United States Patent
Yae et al.

(10) Patent No.: US 9,848,457 B1
(45) Date of Patent: Dec. 19, 2017

(54) WIRELESS CONNECTION SYSTEM AND METHOD OF CONTROLLING SAME

(71) Applicant: HYUNDAI MOTOR COMPANY, Seoul (KR)

(72) Inventors: Seong Soo Yae, Hwaseong-si (KR); Soon Kwon Paik, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/426,671

(22) Filed: Feb. 7, 2017

(30) Foreign Application Priority Data

Oct. 19, 2016 (KR) .................. 10-2016-0135530

(51) Int. Cl.
| | |
|---|---|
| H04W 76/02 | (2009.01) |
| H04W 4/00 | (2009.01) |
| H04M 1/725 | (2006.01) |
| H04W 8/00 | (2009.01) |
| H04B 17/318 | (2015.01) |
| H04W 12/04 | (2009.01) |

(52) U.S. Cl.
CPC ........ H04W 76/023 (2013.01); H04B 17/318 (2015.01); H04M 1/72583 (2013.01); H04W 4/008 (2013.01); H04W 8/005 (2013.01); H04W 12/04 (2013.01)

(58) Field of Classification Search
CPC .................................................. H04L 2209/84
See application file for complete search history.

(56) References Cited

U.S. PATENT DOCUMENTS

| | | | |
|---|---|---|---|
| 8,880,240 B2 | 11/2014 | Grimm et al. | |
| 2006/0135064 A1* | 6/2006 | Cho | H04M 1/7253 455/41.1 |
| 2010/0198692 A1* | 8/2010 | Hotta | G01C 21/26 705/14.62 |
| 2010/0241857 A1* | 9/2010 | Okude | B60R 25/24 713/168 |
| 2013/0059571 A1 | 3/2013 | King, II et al. | |

(Continued)

FOREIGN PATENT DOCUMENTS

| | | |
|---|---|---|
| JP | 2016-46797 A | 4/2016 |
| KR | 10-1241293 B1 | 3/2013 |

(Continued)

*Primary Examiner* — Hsin-Chun Liao
(74) *Attorney, Agent, or Firm* — Knobbe Martens Olson & Bear LLP (57) ABSTRACT

Disclosed are a wireless connection system capable of conveniently connecting two devices through short-range wireless communication and a method of controlling the same. A method of controlling a mobile terminal performing wireless connection to a vehicle includes displaying a first menu corresponding to a first connection type and a second menu corresponding to a second connection type according to a first command, selecting the first menu or the second menu according to a second command, and performing automatic connection to the vehicle through a connection type corresponding to a menu selected by the second command. The first connection type uses information about whether a wireless connection address of the vehicle is equal to a pre-stored address and the second connection type uses the wireless connection address acquired from a digital code provided through the vehicle.

18 Claims, 7 Drawing Sheets

(56) References Cited

U.S. PATENT DOCUMENTS

2013/0311694 A1* 11/2013 Bhamidipati ....... H04M 1/7253
    710/303
2015/0187145 A1  7/2015 Park
2015/0244878 A1* 8/2015 MaCauley ............ G06F 3/1204
    358/1.2

FOREIGN PATENT DOCUMENTS

| KR | 10-2013-0102149 A | 9/2013 |
| KR | 10-1459481 B1 | 11/2014 |
| KR | 10-2015-0093065 A | 8/2015 |

* cited by examiner

WIRELESS CONNECTION SYSTEM AND METHOD OF CONTROLLING SAME

This application claims the benefit of Korean Patent Application No. 10-2016-0135530, filed on Oct. 19, 2016, which is hereby incorporated by reference as if fully set forth herein.

BACKGROUND

Field

The present disclosure relates to a wireless connection system and a method of controlling the same and, more particularly, to a wireless connection system capable of conveniently connecting two devices through short-range wireless communication and a method of controlling the same.

Discussion of the Related Art

Recently, due to the widespread use of smartphones and increase of availability of short-range communication such as Bluetooth and Wi-Fi, users who use an interconnection function between devices using short-range communication have been increasing in number. In particular, Bluetooth technology is becoming popular for simple connection between a smartphone and a vehicle Bluetooth connection serves to connect two devices using an infrastructure called Bluetooth. Connection is started from a request for connection after one device searches for another.

However, users who are not familiar with a technique regarding such a connection procedure may have difficulty in manipulation for connection such that related functions are not used in many cases. A Bluetooth connection procedure between a vehicle and a smartphone will now be described by way of example.

First, a user calls a set menu from a smartphone to select wireless connection and searches for a Bluetooth menu from the smartphone which is wirelessly connected to activate Bluetooth. Next, if a procedure for searching for a device supporting Bluetooth connection is performed, the user confirms a result of the device search procedure, selects an item corresponding to a vehicle, and then waits for connection acknowledgement according to a predetermined protocol (e.g., Secure Simple Pairing (SSP)), thereby ending connection.

Consequently, users having difficulty in performing this complicated process tend not to use even a hands-free function for which Bluetooth connection is indispensable.

The disclosure of this section is to provide background of the invention. Applicant notes that this section may contain information available before this application. However, by providing this section, Applicant does not admit that any information contained in this section constitutes prior art.

SUMMARY

Accordingly, the present invention is directed to a wireless connection system and a method of controlling the same that substantially obviate one or more problems due to limitations and disadvantages of the related art.

An aspect of the present invention is to provide a method of more conveniently performing wireless connection between devices and a wireless connection system for performing the same.

Another aspect of the present invention is to provide a wireless connection system for performing connection by simple selection through a device by a user without performing manipulation for complicated Bluetooth connection and a method of controlling the same.

The aspects of the present invention are not limited to what has been particularly described hereinabove and other aspects not described herein will be more clearly understood by persons skilled in the art from the following description.

To achieve these aspects and other advantages, as embodied and broadly described herein, a method of controlling a mobile terminal performing wireless connection to a vehicle includes displaying a first menu corresponding to a first connection type and a second menu corresponding to a second connection type according to a first command, selecting the first menu or the second menu according to a second command, and performing automatic connection to the vehicle through a connection type corresponding to a menu selected by the second command, wherein the first connection type uses information about whether a wireless connection address of the vehicle is equal to a pre-stored (pre-assigned) address and the second connection type uses the wireless connection address acquired from a digital code provided through the vehicle.

In another aspect of the present invention, a mobile terminal for performing wireless connection to a vehicle includes a display configured to display a first menu corresponding to a first connection type and a second menu corresponding to a second connection type according to a first command, a wireless communication unit configured to perform wireless communication with the vehicle, and a controller configured to control the wireless communication unit so that automatic connection to the vehicle is performed through a connection type corresponding to a menu selected by the second command upon selecting the first menu or the second menu according to a second command, wherein the first connection type uses information about whether a wireless connection address of the vehicle is equal to a pre-stored address and the second connection type uses the wireless connection address acquired from a digital code provided through the vehicle.

BRIEF DESCRIPTION OF THE DRAWINGS

The accompanying drawings, which are included to provide a further understanding of embodiments the invention and are incorporated in and constitute a part of this application, illustrate embodiment(s) of the invention and together with the description serve to explain features of the invention. In the drawings.

DETAILED DESCRIPTION

Reference will now be made in detail to embodiments of the present invention, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" used in the description below are given or used together only in consideration of ease in preparation of the specification and do not have distinctive meanings or functions.

In addition, in the following description of the embodiments disclosed herein, a detailed description of related known technologies will be omitted when it may make the subject matter of the embodiments disclosed herein rather unclear.

To provide a more convenient wireless connection function to a user, an embodiment of the present invention proposes that one of devices that perform mutual connection provide a plurality of connection types to the user and automatically perform a connection process according to a corresponding connection type when the user selects one of the connection types, so that manipulation by the user is minimized.

It will be assumed in the following description that one of devices performing mutual connection is an Audio Video Navigation (AVN) system and the other is a smartphone. However, this is purely for convenience of description and it is apparent to those skilled in the art that the following description is applicable to any devices capable of performing mutual wireless connection.

An aspect of the invention provides a system and method for automatic pairing between a mobile device smartphone) and a vehicle's Bluetooth device. In embodiments, when a user activates a smartphone application, the smartphone prompts a user to enter information of the vehicle (manufacturer, brand, model, year). Using the information of the vehicle, the smartphone identifies at least one predetermined (reserved) Bluetooth address range that is corresponding to the vehicle information. In embodiments, the smartphone identifies a corresponding address range from a local or remote database in which at least one Bluetooth address or address range is associated with at least part of the vehicle information. In embodiments, at least one Bluetooth address range is assigned to a particular car model produced in a particular year. In embodiments, a particular Bluetooth address of the vehicle's Bluetooth device identifies a particular car model.

In embodiments, subsequent to user input of the vehicle information and subsequent to activation of a pairing mode of the vehicle's Bluetooth device, the smartphone scans Bluetooth signals and identifies (detects) at least one Bluetooth device nearby. When the smartphone application detects a Bluetooth device of which address is within the predetermined Bluetooth address range, the smartphone application initiates a process for pairing a Bluetooth module of the smartphone and the detected Bluetooth device automatically without receiving further user input. In embodiments, when two or more Bluetooth devices having addresses within the predetermined address range are detected at the same time, the smartphone initiates a process to pair with the Bluetooth device that has the strongest signal intensity among the detected devices prior to initiating a process to pair other devices.

In embodiments, a computerized controller installed in a vehicle controls operation of a Bluetooth device of the vehicle and a display of the vehicle. In response to a user's command to activate a pairing mode (pairing standby) of the Bluetooth device, the computerized controller codes cause a QR code or another format of visual code. The code displayed by the display includes information representing a Bluetooth address of the vehicle's Bluetooth device. In embodiments, when a smartphone captures or scans the code displayed, the smartphone initiates a process to pair its Bluetooth device with the vehicle's Bluetooth device without receiving father user instructions.

According to an embodiment, the plural connection types may be provided through an application in a smartphone.

In addition, according to an aspect of the present invention, one of the plural connection types may be an automatic connection type for automatically performing device search and selection and another may be a code recognition type for recognizing a digital code displayed on an AVN system of a vehicle to acquire information necessary for connection and performing connection using the acquired information. To this end, the AVN system of the vehicle may generate a digital code corresponding to the information necessary for connection and display the generated code so that the code can be optically read.

According to an embodiment, the above-described digital code may include an optically recognizable digital code such as a bar code and a Quick Response (QR) code and the information necessary for connection may be included in the code in encrypted form. In the following description, the digital code is assumed to be, but not necessarily limited to, the "QR code" for convenience.

According to an embodiment, information for identifying an AVN system of a vehicle to which the smartphone desires to be connected, for example, information about a Bluetooth Device (BD) address allocated to a specific vehicle group per manufacturer or year of manufacture, may be pre-stored or updated in the smartphone.

According to an embodiment, the smartphone may consider strength of a wireless signal in addition to the information about the BD address in order to accurately determine the AVN system of the vehicle to which the smartphone desires to be connected.

Hereinafter, operation processes of a vehicle AVN system and a smartphone according to an embodiment of the present invention will be described with reference to FIGS. 1 and 2.

Figure 1:
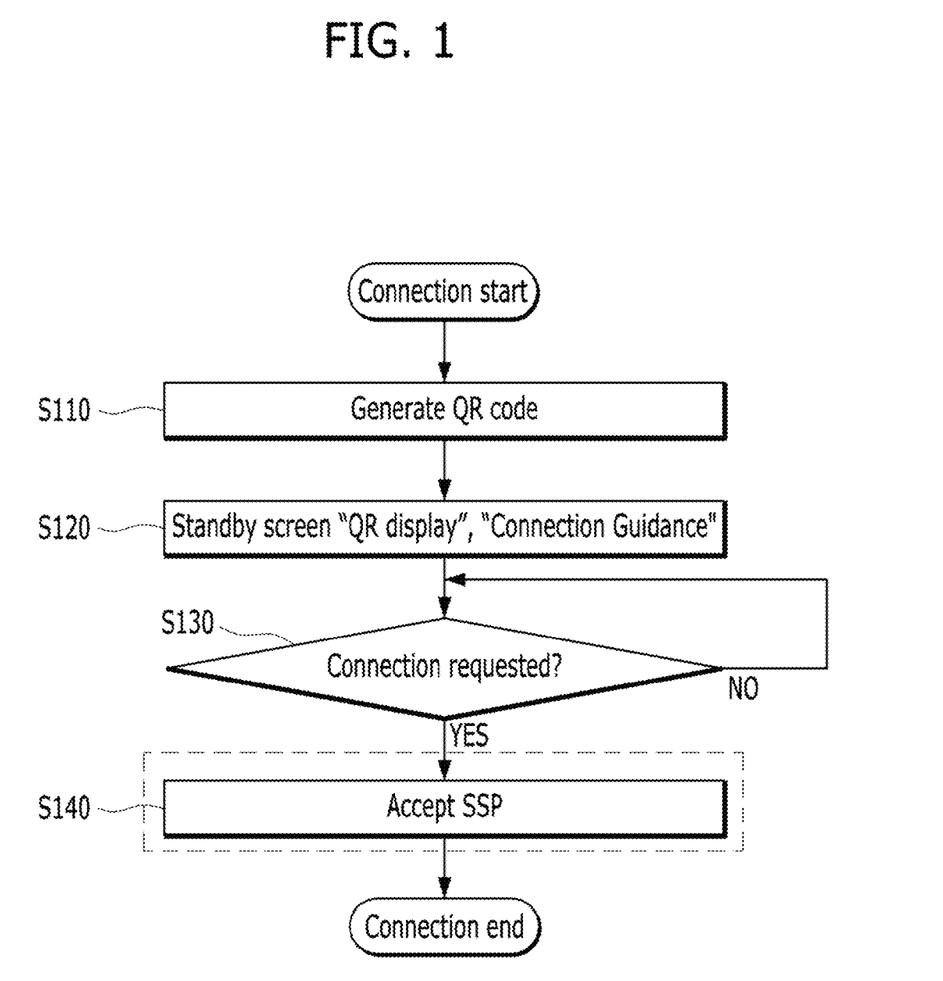
FIG. 1 is a flowchart illustrating an operation process of a vehicle AVN system according to an embodiment of the present invention.

FIG. 1 is a flowchart illustrating an operation process of a vehicle AVN system according to an embodiment of the present invention.

Referring to FIG. 1, as a connection procedure is started, the vehicle AVN system may generate a QR code (S110). The QR code may include information necessary for connection, e.g., a BD address. In addition, the connection procedure may be started as a driver inputs a predetermined command, for example, an "Add New Device" command, for starting connection through the AVN system.

The generated QR code may be displayed on a standby screen through a display of the AVN system (S120). According to setting, Guidance information (e.g., passkey information) for performing a general connection procedure may also be displayed.

If connection is requested by the smartphone (S130), the other connection procedures may be performed. If an SSP protocol is applied according to a system, the remaining connection procedures may be performed after an SSP acceptance procedure is ended (S140).

Next, the operation of the smartphone will now be described with reference to FIG. 2.

Figure 2:
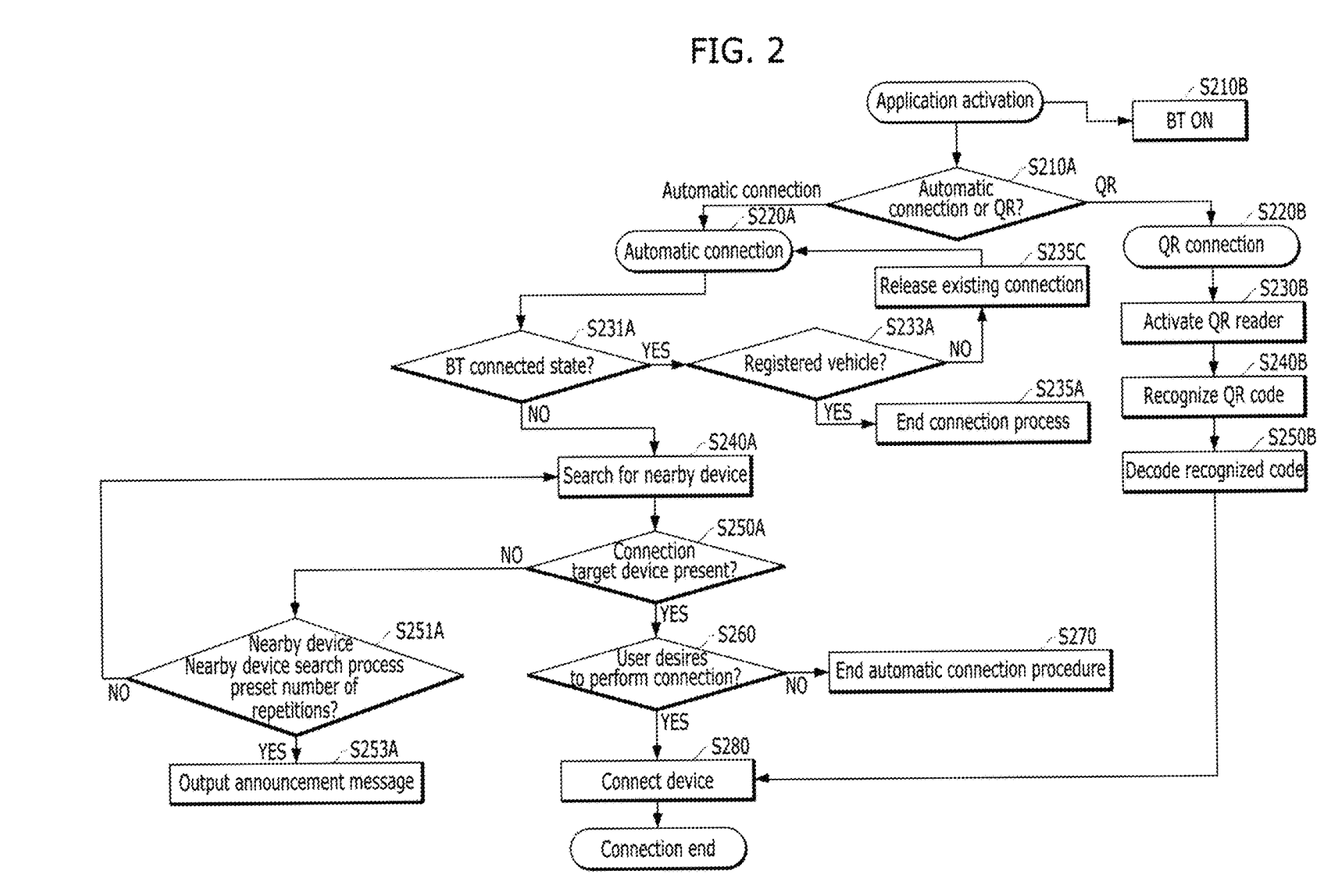
FIG. 2 is a flowchart illustrating an operation process of a smartphone according to an embodiment of the present invention.

FIG. 2 is a flowchart illustrating an operation process of the smartphone according to an embodiment of the present invention. It is assumed in FIG. 2 that the smartphone performs an automatic connection procedure through an application according to activation of a Bluetooth function, provision of a plurality of connection types, and a connection type selected by the user.

Referring to FIG. 2, if an application for providing an automatic connection function is activated, control of the smartphone is performed according to activation of the application. First, a menu through which the user selects a connection type is output through a user interface (S210A) and a Bluetooth (BT) function is activated (S210B).

If the automatic connection type is selected (S220A), the smartphone checks a connection state of BT (S231A). If the smartphone is in a BT connected state, the smartphone determines whether a device connected through BT is an AVN system of a registered vehicle (S233A). If the connected device is the AVN system of the registered vehicle (i.e., a connection target device to which the user desires to connect), since a connection procedure does not need to be re-performed, the connection process is ended (S235A). However, if the connected device is not the registered vehicle, preset connection may be released (S235C).

If there is no connected device at an activation timing of the application or if preset connection is released, the smartphone searches for a nearby device (S240A) and determines whether the connection target device is present (S250A). To this end, it is desirable that the smartphone pre-store information regarding the connection target device. The information regarding the connection target device may be a BD address of a vehicle to which the user desires to connect or a band of the BD address allocated by a manufacturer of the vehicle to the AVN system of the vehicle of the manufacturer. The band of the BD address may be further divided into detailed categories (e.g., a vehicle type and a year of manufacture). The determination process may be performed by determining whether the BD address of the searched device corresponds to a specific vehicle type of the corresponding manufacturer or whether the BD address corresponds to a year of manufacture of a vehicle of the user and may even consider wireless signal strength (e.g., Signal-to-Interference-plus-Noise Ratio (SINR) or Received Signal Strength Indicator (RSSI)) in preparation for the case in which a vehicle having the same year of manufacture and the same vehicle type is present around the user (i.e., the case in which a plurality of BD addresses satisfying conditions in a database (DB) is detected).

As a result of determination, if the searched device is not the connection target device, the process of searching for a nearby device may be repeatedly performed a preset number of times (S251A). If the connection target device is not detected even when the search process has been repeatedly performed a corresponding number of times, the smartphone may output an announcement message indicating that automatic connection is impossible (S253A).

Unlike this, if the connection target device is detected, the smartphone confirms whether the user desires to finally perform connection (S260) and the remaining device connection procedures may be automatically performed (S280). If it is not confirmed whether the user desires to perform connection or if the user denies connection, the automatic connection procedure may be ended (S270).

Meanwhile, if the user selects QR connection using recognition of a QR code (S220B), the smartphone may activate a QR reader function for reading the QR code displayed on a display of the AVN system (S230B). To optically read the QR code, a camera module of the smartphone may be activated. If the QR code is recognized (S240B), the smartphone may perform automatic device connection using BD address information of the AVN system included in the recognized code (S280). If the BD address information is included in the QR code in an encrypted state, decoding of the recognized code may be performed (S250B).

In summary, automatic connection may be performed by selection of an automatic connection menu after the application is executed (in case of omitting step S260) and a QR code scheme may be performed only by pointing the smartphone at the display of the AVN system after selecting a code connection menu, thereby providing user convenience.

Hereinafter, a user interface provided to the AVN system and the smartphone will be described with reference to FIGS. 3 and 4.

Figure 3:
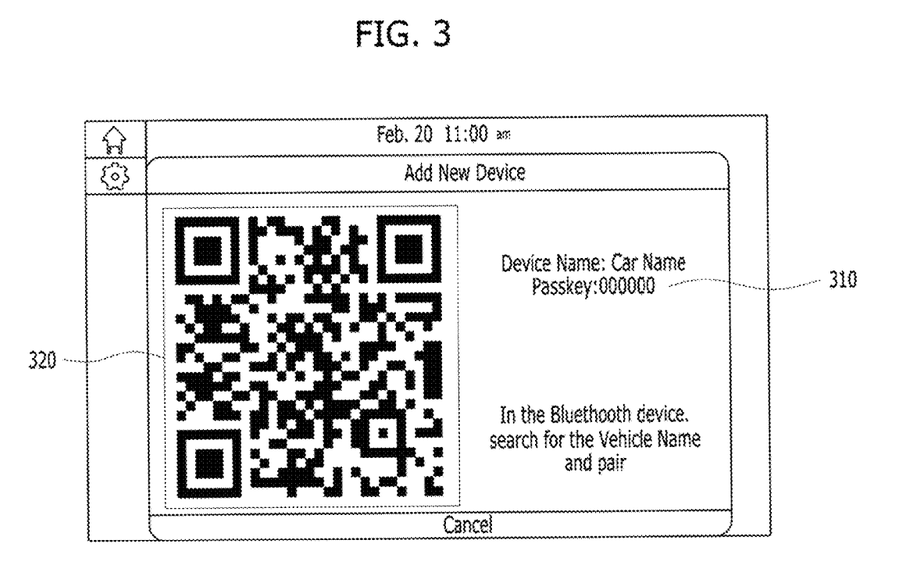
FIG. 3 illustrates an exemplary display state of a connection standby screen provided by the AVN system according to an embodiment of the present invention.

FIG. 3 illustrates an exemplary display state of a connection standby screen provided by the AVN system according to an embodiment of the present invention.

If the user selects an "Add New Device" menu item through a display of the vehicle AVN system, a QR code 320 including BD address information of the AVN system may be displayed together with information for manual connection (e.g., a passkey 310) as illustrated in FIG. 3. According to an embodiment, the information 310 for manual connection may be omitted.

Figure 4A:
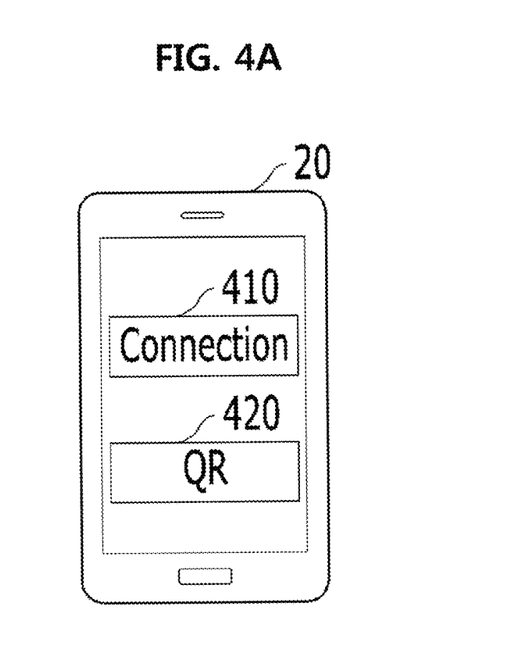
FIGS. 4A, 4B and 4C illustrate an exemplary display state of a user interface of a connection application in the smartphone according to an embodiment of the present invention.
Figure 4B:
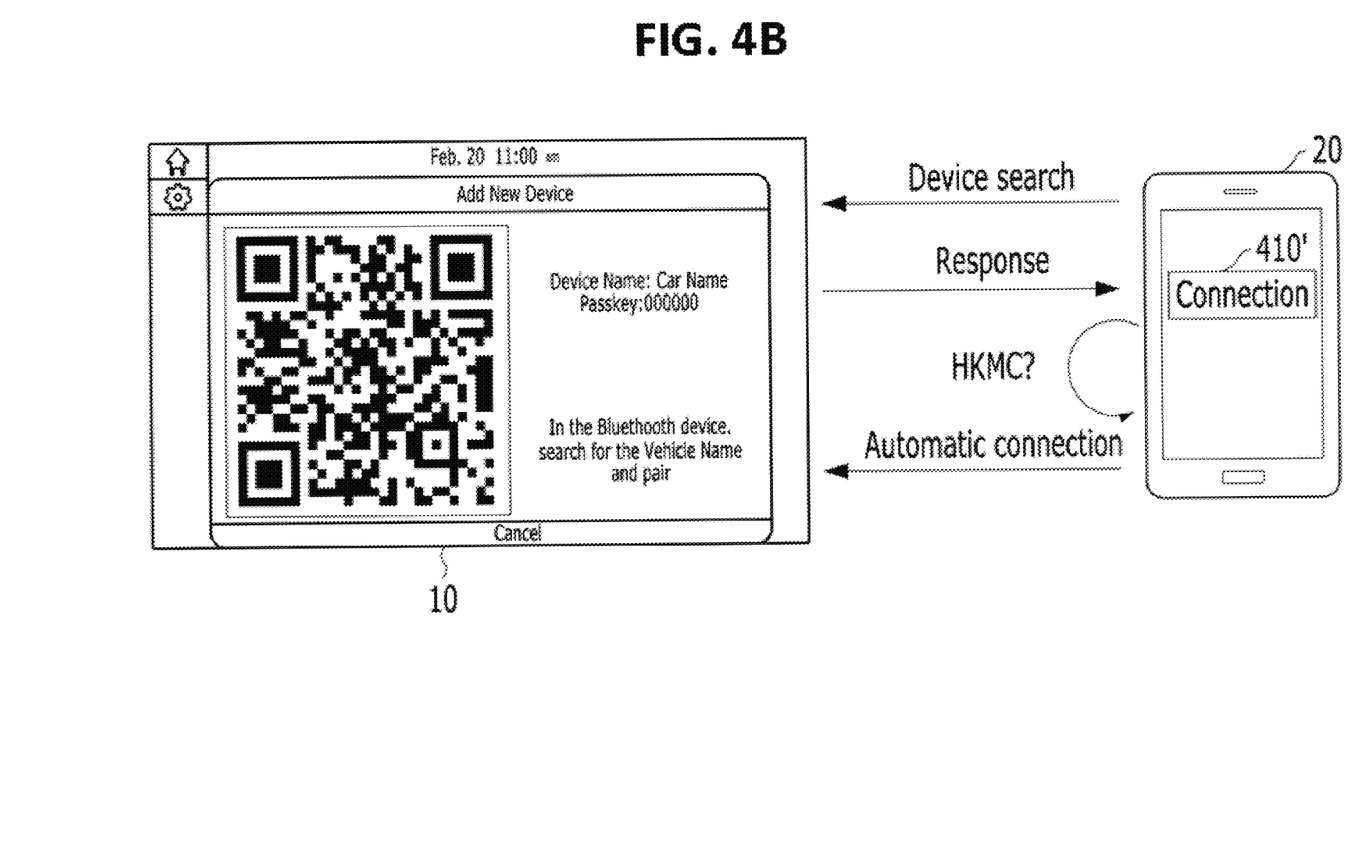
Figure 4C:
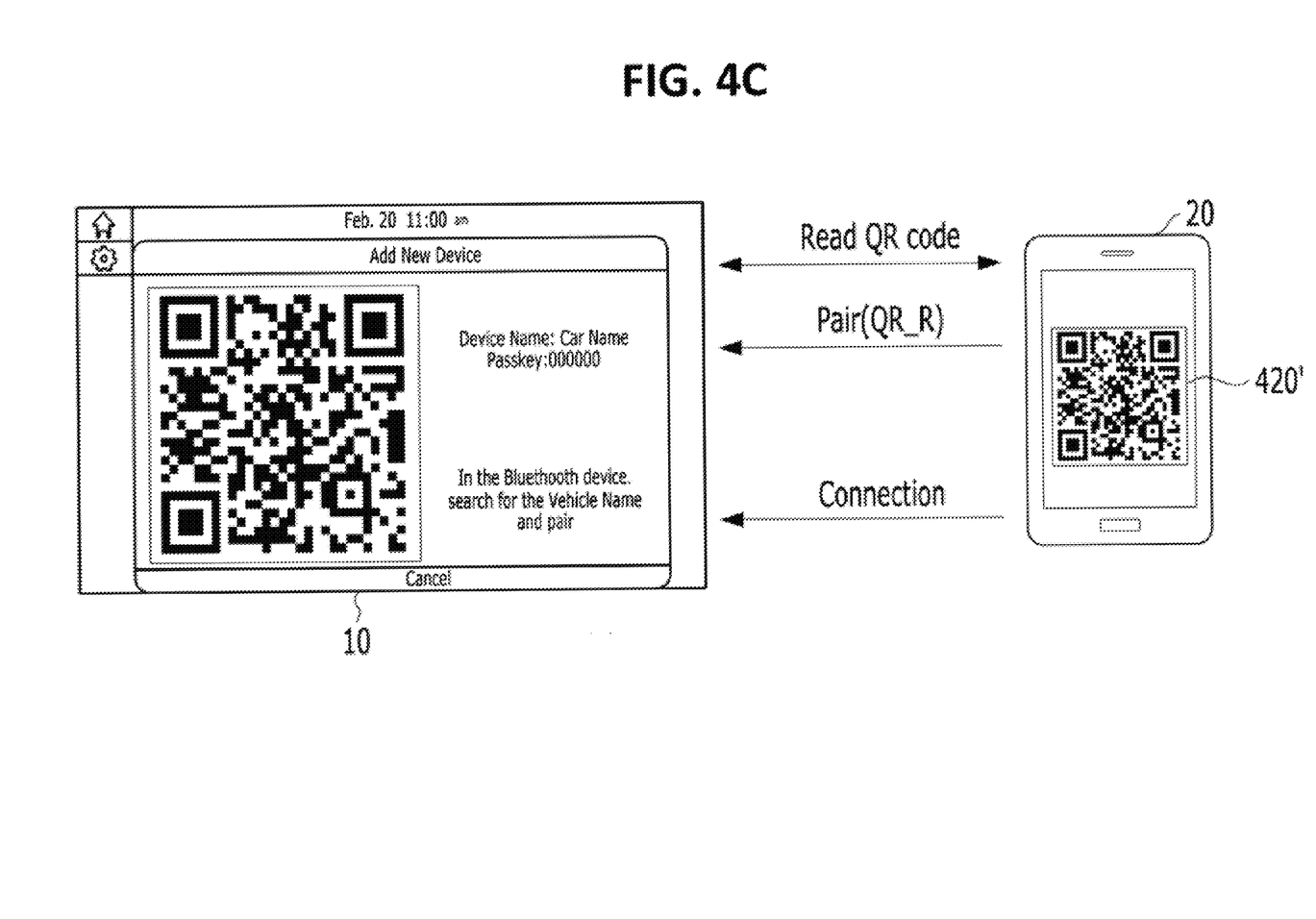

FIGS. 4A, 4B and 4C illustrate an exemplary display state of a user interface of a connection application in the smartphone according to an embodiment of the present invention.

Referring to FIG. 4A, as the smartphone executes a connection application according to an embodiment, an automatic connection menu 410 and a code connection menu 420 may be displayed. If the automatic connection menu 410 is selected, information 410' indicating that automatic connection is being performed is displayed on the smartphone as illustrated in FIG. 4B and the smartphone performs a connection procedure with a vehicle AVN system 10. In this case, an "Add New Device" command has been input so that a QR code has been displayed on the AVN system. The smartphone searches for a nearby device and, if the AVN system is a connection target device as a result of detecting a nearby device, the smartphone may perform automatic connection.

Unlike this, if a code connection menu 420 is selected in FIG. 4A, the smartphone may activate a camera as illustrated in FIG. 4C to read a QR code 320 displayed on the AVN system 10 and perform connection to the AVN system using the read result.

Next, an encryption process of connection information (e.g., BD address of the AVN system) according to an embodiment will now be described with reference to FIG. 5.

Figure 5:
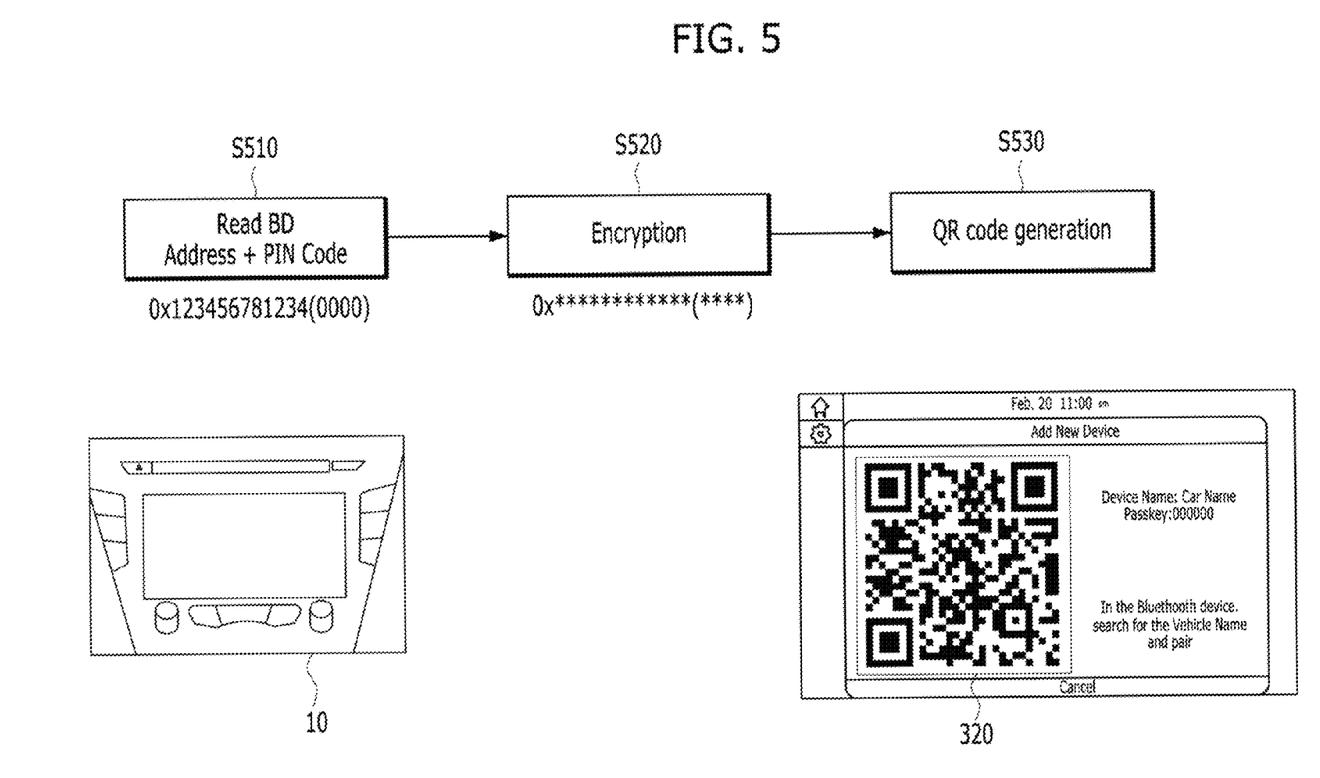
FIG. 5 is a diagram illustrating a process of generating a QR code according to encryption of connection information in an AVN system according to an embodiment of the present invention.

FIG. 5 is a diagram illustrating a process of generating a QR code according to encryption of connection information in an AVN system according to an embodiment of the present invention.

Referring to FIG. 5, an AVN system 10 may add a predetermined code (e.g., a PIN code or a passkey) to BD address information (S510) and encrypt the code-added BD address information (S520). Next, the AVN system 10 may generate a QR code 320 and display the generated code 320 according to an "Add New Device" command etc. In this case, in order to perform decoding in an application of the smartphone, it is desirable to preshare an encryption algorithm applied during encryption and/or information necessary for encryption (e.g., a personal key or a public key) between the AVN system and the smartphone. This serves to add security to a QR code scheme which is capable of being relatively easily exposed and interpreted. Meanwhile, if a passkey is included in the QR code, since a procedure of additionally inputting or confirming the passkey by the user (e.g., a procedure of confirming the passkey displayed in an SSP scheme) may be omitted, convenience is provided to the user.

Next, configuration of each device will be described with reference to FIG. 6.

Figure 6:
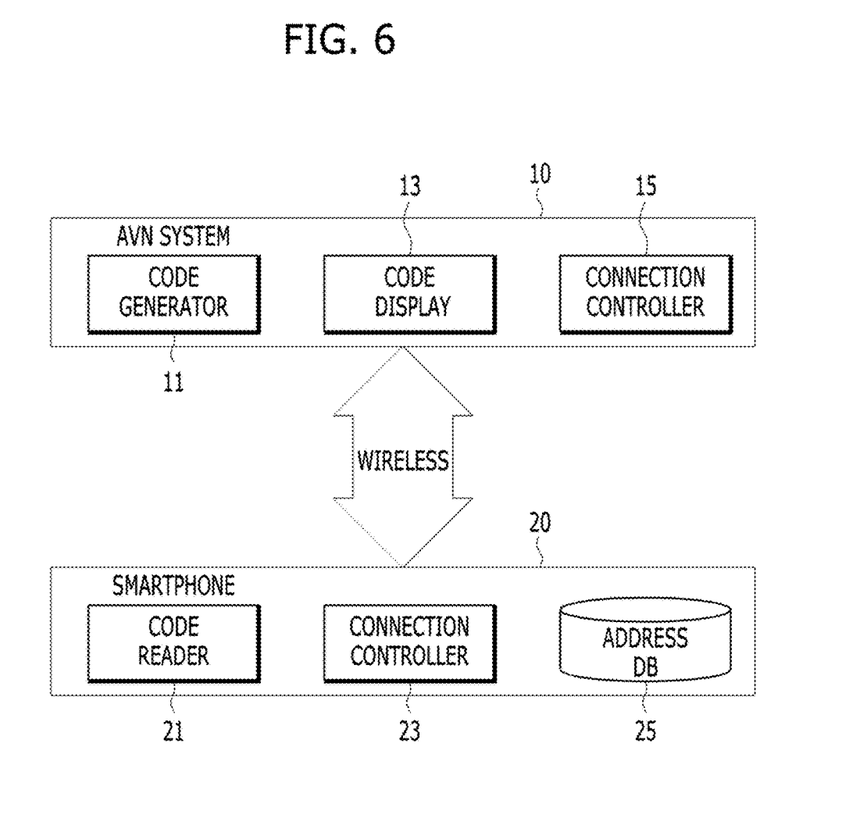
FIG. 6 is a block diagram illustrating an exemplary configuration of an AVN system and a smartphone according to an embodiment of the present invention.

FIG. 6 is a block diagram illustrating an exemplary configuration of an AVN system and a smartphone according to an embodiment of the present invention.

Referring to FIG. 6, an AVN system 10 may include a code generator 11, a code display 13, and a connection controller 15. A smartphone 20 may include a code reader 21, a connection controller 23, and an address DB 25. Obviously, these elements are not necessarily limited to the above configuration. Hereinafter, each element will be described in detail.

The code generator 11 may confirm an address of a wireless communication module (e.g., BD address) installed in an AVN system, such as a BT or Wi-Fi module, and a PIN code, encrypt the address of the wireless communication module and the PIN code, and generate a digital code image.

The code display 13 serves to visually display a QR code generated from the code generator 11. For example, the code display 13 may be a (touch) display constituting the AVN system.

The connection controller 15 may perform overall control of a connection process according to a corresponding protocol upon receiving a request for connection from the smartphone.

Next, the code reader 21 is activated when a user selects code connection and optically reads the code displayed in the AVN system. The code reader 21 decodes the read result and extracts the BD address and the PIN code.

The connection manager 23 may confirm whether the received BD address is present in the address DB 25 and request for connection to the AVN system upon detection of the BD address.

The address DB 25 may store the BD address corresponding to a manufacturer of the AVN system.

The above-described configuration of the smartphone is classified according to functions. In actual implementation, the smartphone may include a camera for capturing a digital code; a wireless communication unit such as a BT module and/or a Wi-Fi module; a memory for storing address information of an address DB, an operating system, and a connection application; a controller in charge of overall control of the above-described elements and an operation for execution of an operating system/application; and an output unit (e.g., a touchscreen) for outputting an execution screen or an operating state of an application.

In a wireless connection system related to at least one embodiment of the present invention configured as described above, wireless connection can be performed by simple manipulation.

In particular, in performing BT connection, since wireless connection is performed by manipulation of selecting a connection type by one device, user convenience is provided.

The present invention may be implemented as computer-readable code that can be written on a computer-readable medium in which a program is recorded. The computer-readable medium may be any type of recording device in which data that can be read by a computer system is stored. Examples of the computer-readable medium include a Hard Disk Drive (HDD), a Solid State Drive (SSD), a Silicon Disk Drive (SDD), a Read Only Memory (ROM), a Random Access Memory (RAM), a Compact Disc (CD)-ROM, a magnetic tape, a floppy disk, an optical data storage, and a carrier wave (e.g., data transmission over the Internet).

It will be apparent to those skilled in the art that various modifications and variations can be made. Thus, the present invention is intended to cover the modifications and variations of this invention provided they come within the scope of the appended claims and their equivalents.

What is claimed is:

1. A method of controlling a mobile terminal performing wireless connection to a vehicle, the method comprising:
    displaying a first menu corresponding to a first connection type and a second menu corresponding to a second connection type according to a first command;
    selecting the first menu or the second menu according to a second command; and
    performing automatic connection to the vehicle through a connection type corresponding to a menu selected by the second command,
    wherein the first connection type uses information about whether a wireless connection address of the vehicle is equal to a pre-stored address and the second connection type uses the wireless connection address acquired from a digital code provided through the vehicle.

2. The method according to claim 1, wherein, if the first connection type is selected by the second command, the performing automatic connection includes:
    searching for a connectable nearby device;
    checking the wireless connection address of the vehicle acquired as a result of search from a pre-stored database; and
    performing automatic connection to the vehicle when the wireless connection address is present in the database as a result of checking.

3. The method according to claim 2, wherein the wireless connection address is differently allocated per manufacturer of the vehicle.

4. The method according to claim 3, wherein the wireless connection address is differently allocated per type of the vehicle and per year of manufacture of the vehicle.

5. The method according to claim 2, wherein the performing automatic connection includes:
    if a plurality of wireless connection addresses present in the database is detected, determining signal strength corresponding to each of the connection addresses; and
    performing automatic connection using a wireless connection address having greatest signal strength.

6. The method according to claim 1, wherein the performing automatic connection when the second connection type is selected by the second command includes:
    activating a code reader;
    acquiring the wireless connection address using a digital code read through the code reader; and
    performing automatic connection to the vehicle using the acquired wireless connection address.

7. The method according to claim 6, wherein the acquiring the wireless connection address includes decoding the read digital code when the read digital code is encrypted.

8. The method according to claim 6, wherein the digital code further includes a passkey code together with the wireless connection address and wherein the performing automatic connection further includes performing a passkey confirmation procedure using the passkey code.

9. The method according to claim 1, further comprising activating a wireless connection function of the mobile terminal as the application is executed, wherein the first command includes a command for executing an application providing the first menu and the second menu.

10. A mobile terminal for performing wireless connection to a vehicle, the mobile terminal comprising:
- a display configured to display a first menu corresponding to a first connection type and a second menu corresponding to a second connection type according to a first command;
- a wireless communication unit configured to perform wireless communication with the vehicle; and
- a controller configured to control the wireless communication unit so that automatic connection to the vehicle is performed through a connection type corresponding to a menu selected by the second command upon selecting the first menu or the second menu according to a second command,
- wherein the first connection type uses information about whether a wireless connection address of the vehicle is equal to a pre-stored address and the second connection type uses the wireless connection address acquired from a digital code provided through the vehicle.

11. The mobile terminal according to claim 10, further comprising a memory configured to store a database including the pre-stored address,
- wherein, if the first connection type is selected by the second command, the controller searches for a connectable nearby device, checks the wireless connection address of the vehicle acquired as a result of search from the database, and performs automatic connection to the vehicle when the wireless connection address is present in the database as a result of checking.

12. The mobile terminal according to claim 11, wherein the wireless connection address is differently allocated per manufacturer of the vehicle.

13. The mobile terminal according to claim 12, wherein the wireless connection address is differently allocated per type of the vehicle and per year of manufacture of the vehicle.

14. The user equipment according to claim 13, wherein the controller determines signal strength corresponding to each connection address, when a plurality of wireless connection addresses present in the database is detected, and performs automatic connection using a wireless connection address having greatest signal strength.

15. The mobile terminal according to claim 10, further comprising a camera for optically reading the digital code, wherein, if the second connection type is selected by the second command, the controller acquires the wireless connection address by reading a digital code captured through the camera and performs automatic connection to the vehicle using the acquired wireless connection address.

16. The mobile terminal according to claim 15, wherein the controller decodes the read digital code when the read digital code is encrypted.

17. The mobile terminal according to claim 15, wherein the digital code further includes a passkey code together with the wireless connection address and the controller performs a passkey confirmation procedure using the passkey code.

18. The mobile terminal according to claim 10, wherein the first command includes a command for executing an application providing the first menu and the second menu and activates a wireless connection function as the application is executed.

* * * * *